(12) United States Patent
Herzinger et al.

(10) Patent No.: US 9,296,923 B2
(45) Date of Patent: Mar. 29, 2016

(54) METHOD FOR ESTABLISHING AN ADHESIVE CONNECTION BETWEEN AT LEAST TWO COMPONENTS, IN PARTICULAR VEHICLE BODY COMPONENTS, BY USE OF POSITIVE-FIT ELEMENTS

(71) Applicant: Bayerische Motoren Werke Aktiengesellschaft, Munich (DE)

(72) Inventors: Thomas Herzinger, Munich (DE); Johann van Niekerk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 106 days.

(21) Appl. No.: 13/914,807

(22) Filed: Jun. 11, 2013

(65) Prior Publication Data
US 2013/0269873 A1  Oct. 17, 2013

Related U.S. Application Data

(63) Continuation of application No. PCT/EP2011/005578, filed on Nov. 5, 2011.

(30) Foreign Application Priority Data

Dec. 21, 2010  (DE) .................. 10 2010 063 717

(51) Int. Cl.
*B29C 65/54* (2006.01)
*B29C 65/56* (2006.01)
(Continued)

(52) U.S. Cl.
CPC . *C09J 5/00* (2013.01); *B29C 65/54* (2013.01); *B62D 27/026* (2013.01);
(Continued)

(58) Field of Classification Search
CPC ........ B29C 65/48; B29C 65/56; B29C 65/54; B29C 65/542
USPC ................. 156/91; 52/511, 543, 544
See application file for complete search history.

(56) References Cited

U.S. PATENT DOCUMENTS 2,275,900 A * 3/1942 Hall ............................ 52/511
3,093,847 A   6/1963 Strecker
(Continued)

FOREIGN PATENT DOCUMENTS

DE    88 08 239 U1    10/1988
DE    197 21 478 A1   11/1998
(Continued)

OTHER PUBLICATIONS

Corresponding International Search Report with English Translation dated Jul. 25, 2012 ( ten (10) pages).
(Continued)

*Primary Examiner* — Scott W Dodds
(74) *Attorney, Agent, or Firm* — Crowell & Moring LLP

(57) ABSTRACT

A vehicle body construction method is provided for connecting two components which are to be rigidly connected to one another. A first component is provided on which a first positive-fit element projects away from the first component. A second component is provided, which includes a second positive-fit element which cooperates with the first positive-fit element of the first component. The two components are detachably fixed by placing them against one another such that the positive-fit elements mesh with or latchingly engage one another. The components are held relative to one another at least in one direction and are permanently connected by use of an adhesive that is located between mutually facing surfaces of the two components.

9 Claims, 3 Drawing Sheets

(51) Int. Cl.
*C09J 5/00* (2006.01)
*B62D 27/02* (2006.01)
*B62D 29/00* (2006.01)
*F16B 5/06* (2006.01)
*F16B 11/00* (2006.01)
*B29C 65/48* (2006.01)
*F16B 5/08* (2006.01)

(52) U.S. Cl.
CPC ........... *B62D 29/005* (2013.01); *F16B 5/0642* (2013.01); *F16B 11/006* (2013.01); *B29C 65/48* (2013.01); *B29C 65/56* (2013.01); *F16B 5/0657* (2013.01); *F16B 5/0664* (2013.01); *F16B 5/08* (2013.01)

(56) References Cited

U.S. PATENT DOCUMENTS

| | | | |
|---|---|---|---|
| 3,188,731 A | | 6/1965 | Sweeney |
| 3,680,910 A | * | 8/1972 | Stanner ............... 296/29 |
| 4,637,116 A | | 1/1987 | Parisch et al. |
| 5,667,868 A | * | 9/1997 | Freeman ............... 428/120 |
| 6,291,792 B1 | * | 9/2001 | Fussnegger et al. ......... 219/118 |
| 6,896,319 B1 | | 5/2005 | Huang et al. |
| 2008/0210672 A1 | | 9/2008 | Meyer et al. |
| 2013/0036594 A1 | | 2/2013 | Hammer et al. |
| 2013/0043228 A1 | | 2/2013 | Hammer et al. |
| 2013/0128664 A1 | | 5/2013 | Ihle et al. |

FOREIGN PATENT DOCUMENTS

| | | |
|---|---|---|
| DE | 198 31 982 A1 | 1/2000 |
| DE | 10 2005 027 119 A1 | 1/2007 |
| DE | 60 2004 004 575 T2 | 10/2007 |
| DE | 10 2008 038 747 A1 | 2/2010 |
| DE | 10 2010 028 2 | 10/2011 |
| DE | 10 2010 028 322 A1 | 11/2011 |
| EP | 0 494 116 A2 | 7/1992 |
| EP | 1 855 869 B1 | 12/2009 |
| JP | 2008-273053 A | 11/2008 |
| WO | WO 2006/051022 A1 | 5/2006 |
| WO | WO 2011/134563 A1 | 11/2011 |

OTHER PUBLICATIONS

German Examination Report with English Translation dated Aug. 29, 2011 ( ten (10) pages).

German-language Office Action dated Sep. 9, 2013 (six (6) pages).

English translation of Chinese Office Action dated Feb. 4, 2015 (eight (8) pages).

Chinese Office Action issued in counterpart Chinese Application No. 201180060525.9 dated Oct. 16, 2015 with English-language translation (fifteen (15) pages).

* cited by examiner

METHOD FOR ESTABLISHING AN ADHESIVE CONNECTION BETWEEN AT LEAST TWO COMPONENTS, IN PARTICULAR VEHICLE BODY COMPONENTS, BY USE OF POSITIVE-FIT ELEMENTS

CROSS REFERENCE TO RELATED APPLICATIONS

This application is a continuation of PCT International Application No. PCT/EP2011/005578, filed Nov. 5, 2011, which claims priority under 35 U.S.C. §119 from German Patent Application No. DE 10 2010 063 717.3, filed Dec. 21, 2010, the entire disclosures of which are herein expressly incorporated by reference.

BACKGROUND AND SUMMARY OF THE INVENTION

The present invention concerns a method for connecting at least two components and, in particular, to a body construction method for connecting at least two components such as vehicle body parts to be fixedly connected to one another.

A method of this type is known from the older, unpublished German Patent Application DE 10 2010 02823.1.

In mass production of vehicle bodies, a great number of individual body parts as well as add-on parts such as, for example, fixtures, etc. are assembled in a substantially fully automated manner. In a joining process two or more body parts are first positioned relative to one another by use of complicated gripping and holding technology and subsequently connected to one another, for example, by gluing and, for reasons of strength, by subsequent resistance spot welding. It is considered a disadvantage of resistance spot welding following the gluing that the glue that is used burns in the immediate vicinity of the weld points. Due to this the structural strength of the component connection is reduced overall. It is furthermore disadvantageous that the component connection in the area around the weld points is possibly no longer tight, which can lead to corrosion problems.

It is the object of the invention to provide a method for connecting at least two components which is very simple and is suitable for mass production, and makes it possible to eliminate gripping devices partially or entirely.

This and other objects are achieved by a body construction method for connecting at least two components such as vehicle body parts to be fixedly connected to one another. A first component is provided on which at least one first positive-fit element projecting away from the first component is provided. A second component is provided which has at least one second positive-fit element working together with the first positive-fit element of the first component. The two components are detachably fixed by placing the same on one another in such a manner that the positive-fit elements mesh or latchingly engage with one another and the components thereby are held relative to one another at least in one direction. A long-term connection of the two components is achieved by a glue introduced or located between mutually facing surfaces of the two components.

The starting point of the invention is a method for connecting at least two components. The term "component" is to be interpreted extremely broadly. It includes in principle all types of components. In the field of body construction, as examples, vehicle body parts as well as add-on parts, interior equipment components, etc. are subsumed under the term "component." The invention is, however, applicable to a large number of other fields of application, such as, for example, in the field of so-called "white ware" (washing machine, dryers, dishwashers, etc.). Although the invention is explained at points in the following description in connection with vehicle body construction this is in no way to be understood as restrictive but rather that the technology can also be used in other technological fields.

According to the invention a first component is provided initially on which at least one first positive-fit element projecting away from the first component is provided. The first positive-fit element can be, for example, a "male fixation element" projecting away from the first component. The first positive-fit element can have entirely or partially the shape of a sphere or spherical cap or entirely or partially a sphere-like shape. The term "sphere-like" is also to be interpreted very broadly and not restricted to the mathematical definition of a spherical geometry. Sphere-like can mean, for example, "convexly curved." Preferably, the spherical or sphere-like male fixation element is rotationally symmetric with respect to a normal direction of one or both components at the point of the first positive-fit element. The terms "spheriform " or "sphere-like" include quite generally "round" or "curved," in particular "convexly curved geometries." A first positive-fit element configured in this manner can be "plugged together" with the second component very simply. Through a round, edgeless geometry of the first positive-fit element the danger is minimized that the two components tilt undesirably on being plugged together.

In addition to the first component, a second component is provided which has a second positive-fit element working together with the first positive-fit element of the first component. The second positive-fit element can in particular be a "female fixation element." The term "female fixation element" is also to be interpreted very broadly. What is meant are structural configurations which make it possible to introduce the male fixation element in a first introduction device into the female fixation element. In a "first mounting step" the two components are first of all provisionally detachably affixed to one another or fixed relative to one another, for example, by placing the two components on one another in such a manner that the positive-fit elements mesh and the two components thereby hold relative to one another at least in one direction. Subsequently the two components are connected to one another long-term and, for example, by means of glue located between mutually facing surfaces of the two components.

The glue can be applied before the detachable connection of the two components on one of the two components or on both components (or stated more precisely on mutually facing surfaces of the two components). As an alternative to this for this purpose the two components can first be detachably connected to one another via the positive-fit elements and only thereafter can glue be introduced between the two components.

A significant advantage of the invention consists of the fact that the components do not necessarily have to be held relative to one another by holding or gripping devices until hardening of the glue, but rather it is sufficient that the two components are provisionally fixed relative to one another by the positive-fit elements working together with one another.

A hardening of the glue can be accelerated by heat being supplied. For example, it can be provided that the two components are introduced into an oven or that heat is supplied to the adhesive layer in another way (for example, inductively, by microwave, or the like).

The first positive-fit element can be a separate part to be distinguished from the first component, the separate part being connected to the first component during or only after the production of the first component. The first positive-fit element can be bonded to the first component, for example, by welding the first positive-fit element onto the first component. As an alternative to this, the first positive-fit element can also be connected to the first component by other joining methods, in particular by cold joining processes such as, for example, pressing, riveting or by other joining methods.

According to a further development of the invention, the glue is applied in the area of the positive-fit elements and/or applied so that at least when the two components are placed on one another or pressed together it flows into the area of the positive-fit elements. For example, the glue can reach directly up to the positive-fit elements. Preferably, the glue is applied so that it extends around the first positive-fit element. For this purpose, the glue can be applied over a large surface onto the first and/or second component or also only locally in the area of the first positive-fit element.

The first component can be, in particular, a metal component such as, for example, sheet steel, an aluminum sheet, or the like. The second component can also be a metal sheet such as, for example, a steel or aluminum component or however also of another material such as, for example, a component produced from fiber-reinforced plastic. Now being used more often are glass parts whose rigidity is enhanced by glass fibers, carbon fibers, fine metal wires, woven fabric-knitted fabric, or similar structures. One or both components can be, in particular, semi-finished (preformed) or finished body components.

According to a further embodiment of the invention, the male fixation element has an "excess" dimension in relation to the female fixation element. The excess dimension can be in particular in a direction which is transverse to the direction of introduction. Due to this excess dimension when the two components are "plugged together" at the fixation elements they detachably grip one another and/or hold one another together in the direction of insertion, which has the advantage that the adhesive layer is also compressed and thus can harden without additional gripping tools.

Therefore the components can, similarly to the manner known for interlocking building blocks from the field of toys, be plugged together simply and in this way (provisionally) fixed relative to one another. Components such as, for example, individual body components can be connected to one another by one or more component connections of this type, that is, (provisionally) mounted before or during the gluing together. In so doing, the individual components need merely to be plugged together. Depending on the type of components and the gripping force provided structurally the two components can be connected to one another exclusively via the component connection according to the invention (gripping and gluing) or, in addition, via one or more other connection technologies such as, for example, welding, screwing, riveting, clinching, and so on.

A positive fit in the direction of introduction between the positive-fit elements can be provided. However, a positive fit of this type does not necessarily have to be provided. In other words an "undercut" of the first (male) and the second "female)" positive-fit element does not absolutely have to be provided.

The second positive-fit element can be formed by a through-hole provided in the second component. The term "through-hole" is to be interpreted broadly and not restricted to a certain hole geometry. The through-hole can, for example, be circular or have a geometry deviating from a circular shape such as, for example, an essentially square geometry, a triangular, rectangular, or polygonal geometry, where the "corners" can be rounded.

In so far as the first (male) positive-fit element has transverse to the direction of introduction a certain excess in relation to the second (female) positive-fit element, the two positive-fit elements or at least one of the two positive-fit elements must have a certain "minimum elasticity" so that the plugging together is enabled and, after the plugging together, a sufficient gripping force remains.

The first positive-fit element can be, for example, a ball made of solid material, in particular a steel or aluminum ball. A "solid ball" of this type has a comparatively minimal elasticity. The minimum elasticity required for plugging together can be achieved by a corresponding configuration of the second (female) fixation element.

It can be provided that after their plugging together at the positive-fit elements the two components connect to one another in a manner which is free of play, i.e. are fixed in such a manner that they cannot be displaced relative to one another in directions which are transverse to the direction of introduction.

As has already been mentioned the two components can be (provisionally) fixed relative to one another via several component connections of this type or a similar type. Consequently, it is possible to provide on one of the two components at least one additional first (male) positive-fit element which also has partially or entirely the shape of a sphere or partially or entirely a shape similar to that of a sphere and which can be introduced in a direction of introduction or in the same direction of introduction as the other first (male) fixation element into an associated additional female positive-fit element or fixation element which is provided on the other component in question.

The at least one additional second (female) positive-fit element can be formed by a slot or by an elongated through-hole in which the additional first (male) fixation element can be slid in a longitudinal direction of the slot or the elongated through-hole.

Speaking in concrete terms a component connection of this type forms a "fixed mounting" and the at least one additional component connection a "loose mounting." This has the advantage that the two components to be connected to one another can be affixed in one another or plugged together "floatingly" and thus essentially without strain.

According to a further embodiment of the invention there is provided at an edge of the through-hole forming the second (female) positive-fit element at least one flexible gripping element projecting away from the second component. The gripping element exerts from outside a gripping force acting essentially transversely to the direction of introduction on an outer side of the first (male) positive-fit element. The gripping element can be formed in the manner of a tongue and latchingly engage the first (male) positive-fit element. However, this does not absolutely have to be the case. In the case of an undercut there is during the joining together, i.e. during the plugging together of the two positive-fit elements, an "overpressing" and thus an audible catching of the first (male) positive-fit element in the second or on the second (female) positive-fit element.

The gripping element can be a gripping collar extending along the entire edge of the through-hole. As an alternative to this it is possible to provide merely a gripping collar element in the manner of a tongue extending over a section of the circumference. Furthermore, it is possible to provide along the through-hole several tongue-like gripping collars spaced from one another in the circumferential direction, each of which contacts from outside the first (male) positive-fit element on a section of its circumference or a point of its circumference. It can also be provided that merely a part of the gripping collars provided presses from outside against the male positive-fit element.

It can be provided that the gripping collar or collars project away from the second component in the direction of introduction or opposite to the direction of introduction. The at least one gripping collar does not have to be bent around completely perpendicularly in relation to the second component but rather can be set (slightly) obliquely. For example, it can be provided that the at least one gripping collar makes an angle of between 80° and 90° with respect to the surface of the second component in the area of the through-hole.

The through-hole forming the second (female) positive-fit element can be stamped out of the second component. The gripping collar can be an encircling or elevated section of the stamped through-hole.

One or both of the components can in particular be deep-drawn parts. The at least one female positive-fit element which, e.g. can be formed by a through-hole, can be stamped out directly in the deep-drawing tool or produced in a subsequent manufacturing step.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
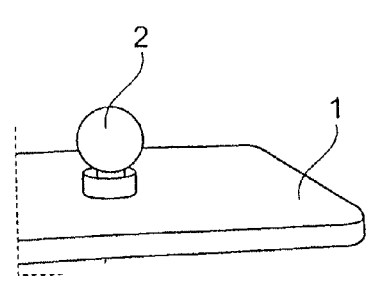
FIG. 1 illustrates a first metal sheet on which a steel ball is welded.

FIG. 1 shows a first metal sheet 1 onto which a steel ball 2 is welded.

Figure 2:
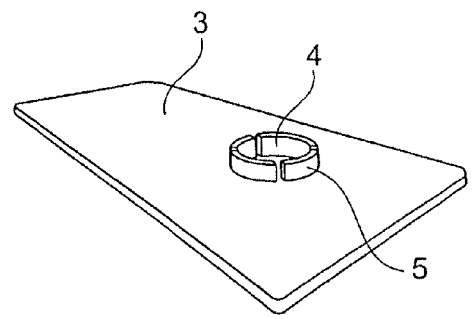
FIG. 2 illustrates a second metal sheet into which a through-hole is stamped and has an encircling gripping collar.
Figure 3:
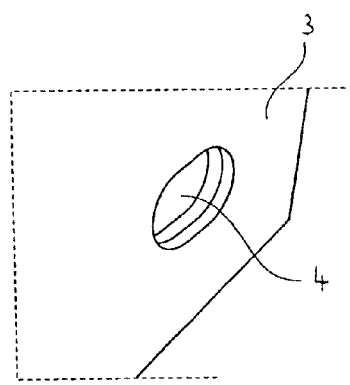
FIG. 3 is another view of the second metal sheet having the through-hole.

FIGS. 2, 3 show a second metal sheet 3 into which a through-hole 4 is stamped which has an encircling collar 5 functioning as a gripping collar. The through-hole 4 or the gripping collar 5 have a negligibly smaller diameter than the ball 2. The gripping collar 5 is, however, sufficiently elastic that the ball can be pushed into the through-hole 4.

The through-hole 4 can have, as shown in FIGS. 2, 3, an approximately rectangular or square shape (with rounded corners). In the case of an approximately square through-hole geometry the gripping collar 5 presses from outside against the ball 2 pointwise at four positions each spaced at about 90° apart.

Figure 4:
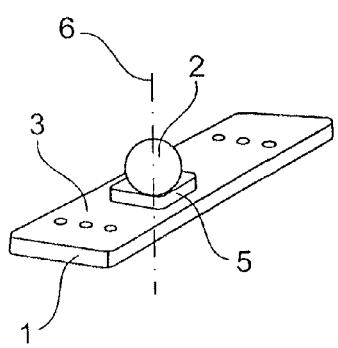
FIG. 4 illustrates two metal sheets in a plugged-together state in accordance with a first embodiment.

FIG. 4 shows the two metal sheets 1, 3 in the plugged-together state. The ball 2 fixed on the metal sheet 1 was pushed through the through-hole 4 from below. The gripping collar 5 presses against the ball 2 essentially transversely to an insertion direction 6 from outside. The two metal sheets 1, 3 are thus positioned fixedly and essentially free of play relative to one another in directions which are at a right angle to the insertion direction 6.

Figure 5:
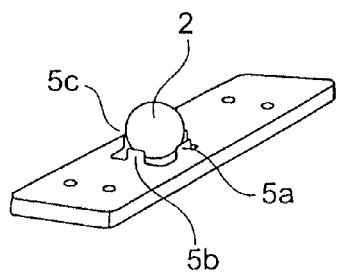
FIG. 5 illustrates the two metal sheets in a plugged-together state in accordance with a second embodiment.

FIG. 5 shows an exemplary embodiment in which instead of an encircling gripping collar several tooth-like gripping collar elements 5a, 5b, 5c are provided, which are distributed uniformly about the circumferential direction.

Figure 6:
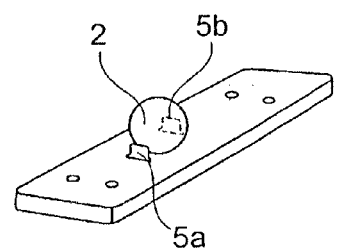
FIG. 6 illustrates the two metal sheets in a plugged-together state in accordance with a third embodiment.

In the exemplary embodiment in FIG. 6, only two tooth-like gripping collar elements 5a, 5b of this type are provided, which are spaced from one another by about 180° in the circumferential direction. The two gripping collar elements 5a, 5b are disposed on opposite sides of the ball 2.

Figure 7:
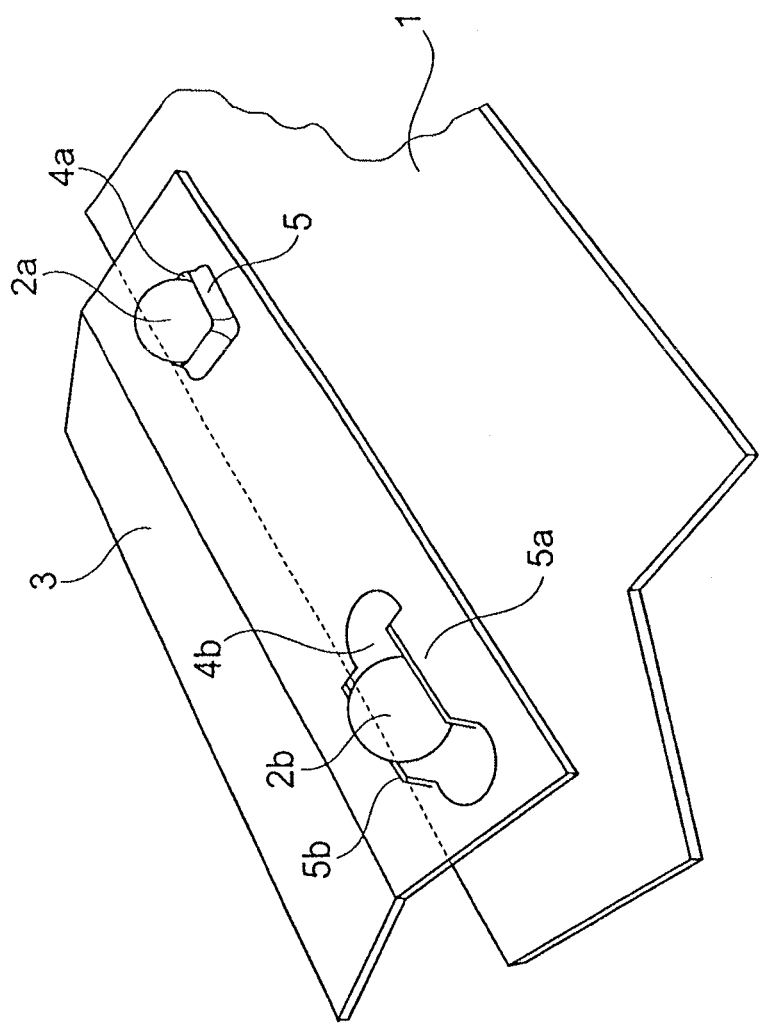
FIG. 7 illustrates two components floatingly affixed to one another according to another embodiment of the invention.

FIG. 7 shows an exemplary embodiment in which a first ball 2a and a second ball 2b are disposed on a first metal sheet 1 and spaced from one another. The two balls 2a, 2b can be welded onto the metal sheet 1.

Figure 8:
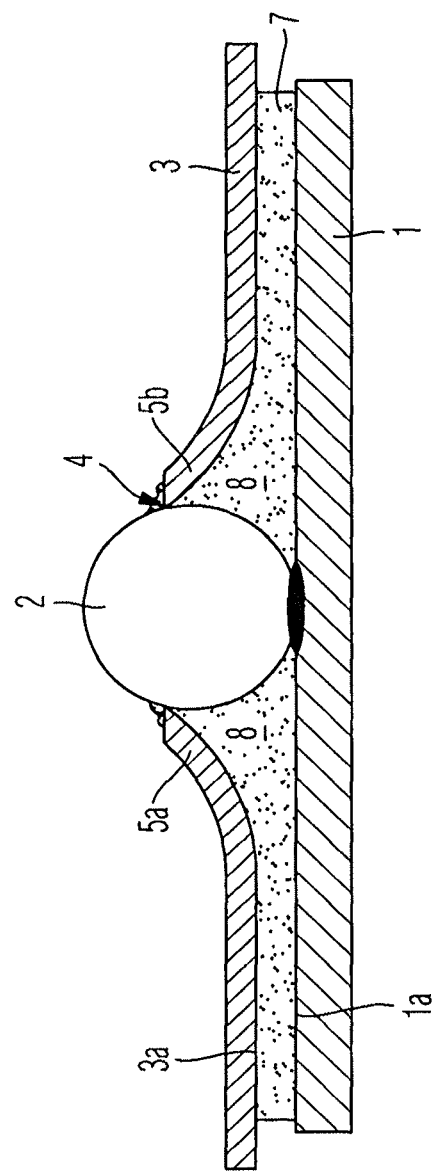
FIG. 8 is a cross section view through a component connection produced according an embodiment of to the invention.

FIG. 8 shows a cross section through a component connection produced according to an embodiment of the invention. Between mutually facing surfaces 1a, 3a of the two components 1, 3 an adhesive layer 7 is introduced. The adhesive layer 7 can, for example, be a liquid, hardenable single-component or multi-component glue.

As can be seen from FIG. 8, the glue 7 is applied so that when the two components 1, 3 are placed on one another or pressed together the glue flows into an undercut area 8 which is formed by the ball 2 welded onto the component 1 and the gripping collars 5a, 5b lying at the outer circumference of the ball.

Thus due to the glue which flows into the "collar hole" (collar hole 4) the ball 2 contributes to the total strength of the component connection. Investigations have shown that a "glued-in ball 2" of this type has a strength which is comparable to that of a resistance spot weld. Since the ball 2 is welded on before the coating or application of the glue on the metal sheet 1, the problem of burning of the glue around the weld point during subsequent welding of components glued together does not occur. As can be seen from FIG. 8, the glue 7 fills up the entire undercut 8, i.e. it reaches directly up to the ball 2, which results in optimal strength.

While components glued to one another up to now had to be fixed relative to one another by gripping elements or the like as long as the glue had still not hardened, gripping elements of this type can be omitted in a component connection, as is represented, for example, in FIG. 8, since now the two components 1, 3 are engaged on one another directly through the positive-fit elements working together, i.e. the ball 2 and the through-hole 4.

In a component connection as is represented in FIG. 7, which includes a "fixed mounting" and a "loose mounting," the two components 1, 3 can slide relative to one another in the longitudinal direction of the elongated hole 4b, whereby material bulges and thus damage to the glue layer (not represented) are avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for fixedly connecting two components to one another, the method comprising the acts of:
    providing a first component having a first positive-fit element projecting away from a surface of the first component, the first positive-fit element being a separate sphere-shaped component welded to the first component;

providing a second component having a second positive-fit element operatively configured to interact with the first positive-fit element of the first component, the second positive-fit element being a through-hole in the second component having one or more gripping collars projecting away from the through-hole in the second component;

detachably fixing the first and second components together by arranging the first and second components on one another such that the first and second positive-fit elements engage one another to hold the first and second components relative to one another at least in one direction, wherein an undercut is formed below the one or more gripping collars and underneath the sphere-shaped component;

supplying a glue between mutually facing surfaces of the first and second components to form a long-term connection of the first and second components, the glue filling up completely the entire undercut upon the detachable fixing of the first and second components to form a glued-in ball connection; and subsequently welding the first and second components together without affecting the glued-in ball connection.

2. The method according to claim 1, wherein the first and second components are vehicle components.

3. The method according to claim 1, wherein the glue is hardened by supplying heat.

4. The method according to claim 1, wherein the first positive-fit element is connected to the first component during production of the first component.

5. The method according to claim 1, wherein the first component is a sheet metal component.

6. The method according to claim 5, wherein the first positive-fit element comprises metal.

7. The method according to claim 1, wherein the through-hole is configured in the form of an oblong slot.

8. The method according to claim 2, wherein at least one of the two components is a fiber-reinforced plastic component.

9. The method according to claim 2, wherein at least one of the first and the second vehicle components is a vehicle body component.

* * * * *